April 7, 1942.   J. L. ADLER   2,279,191

METHOD AND APPARATUS FOR SEISMIC SURVEYING

Filed Aug. 13, 1940

JOSEPH L. ADLER
INVENTOR.

By *Lester B. Clark.*

ATTORNEY

Patented Apr. 7, 1942

2,279,191

UNITED STATES PATENT OFFICE 2,279,191

METHOD AND APPARATUS FOR SEISMIC SURVEYING

Joseph L. Adler, Houston, Tex., assignor to Fabian M. Kannenstine, Houston, Tex.

Application August 13, 1940, Serial No. 352,419

3 Claims. (Cl. 181—0.5)

This invention relates to seismograph method and apparatus for use in geophysical exploration work and particularly to a method and means for obtaining frequency analyzed records of reflected seismic waves whereby a maximum of information is obtained of the reflecting subsurface strata.

In reflection seismology it is customary to receive seismic waves reflected from the various subsurface formations, such waves being detected at a plurality of spaced points and a record produced of the waves arriving at each of such points. In order to produce a record of the arriving waves a transducer or geophone, used singly or in groups, is utilized to convert the seismic impulses into electrical impulses, the latter of which are transmitted thru filters so that only the energy of a predetermined band of frequencies actuates the recording instruments.

Geological strata differ in their capabilities of reflecting seismic impulses of different frequencies. The present invention makes use of this fact by utilizing different bands of frequencies for producing the various wave traces and by means of such technique it is possible to obtain information in addition to that which is obtained in conventional practice. This is accomplished by utilizing different band pass filters in the various recording channels, such filters being so constructed and arranged that multiple wave traces represent energy from all portions of the frequency spectrum of the seismic impulses.

A primary object of the invention is to provide novel method and apparatus for obtaining frequency analyzed seismic records which reveal a maximum of information relative to the subsurface geological strata.

Another object is to provide a record of a seismic event by utilizing a wide range of frequencies present in the seismic impulses.

Still another object is to obtain desired seismic records by producing a plurality of wave traces each of which is produced by a predetermined band of frequencies.

Another object is to provide a frequency analyzed record of a seismic event whereby reflections from a single stratum may readily be distinguished from reflections from different strata.

Still another object is to provide a plurality of wave traces of a seismic event, each individual trace being produced by a predetermined band of frequencies and all of such bands covering the frequency spectrum of the seismic impulses.

A further object is to obtain in seismic records an indication of the predominating or characteristic frequency of each individual stratum.

Still another object is to provide with a single instrument and one operation records at a plurality of frequencies from a single source of seismic impulses.

The foregoing objects together with other objects will be apparent from the following description taken in connection with the accompanying drawing, in which.

Figure 1:
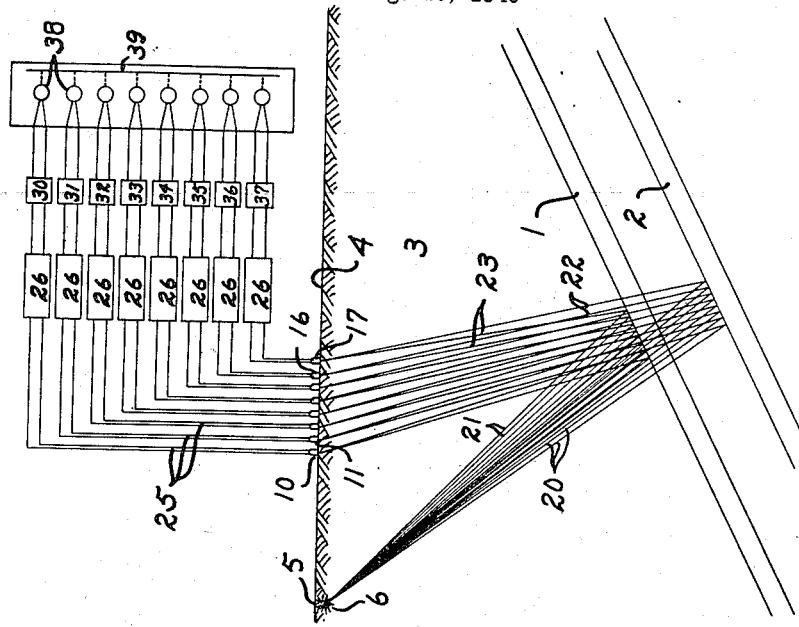
Fig. 1 is a diagrammatic illustration of a field setup used in practicing the invention.

In the arrangement shown in Fig. 1 strata 1 and 2 exist beneath the overburden 3 extending downwardly from the earth surface 4. In order to obtain information as to the nature and location of the strata 1 and 2, a shot hole is drilled in the earth at 5 and a charge of explosive 6 is detonated therein so that seismic waves are set up in the earth and travel in all directions from the center of disturbance.

A plurality of geophones indicated as 10 to 17 are positioned in relative spaced position from each other and the shot hole 5 and are in contact with the earth so that the waves directed along the paths 20 and 21 are reflected from the strata 1 and 2 along the lines 22 and 23 to the respective geophones. It is to be understood that, while an individual geophone is illustrated for each recording channel, a plurality of geophones may be used for each or all of the channels in a manner well known in the art. It is also to be noted that where two strata are involved as in the illustration, the reflections will be transmitted to each of the geophones and will be recorded in the manner as will more fully appear by reference to the graphical illustration of Fig. 2.

Figure 2:
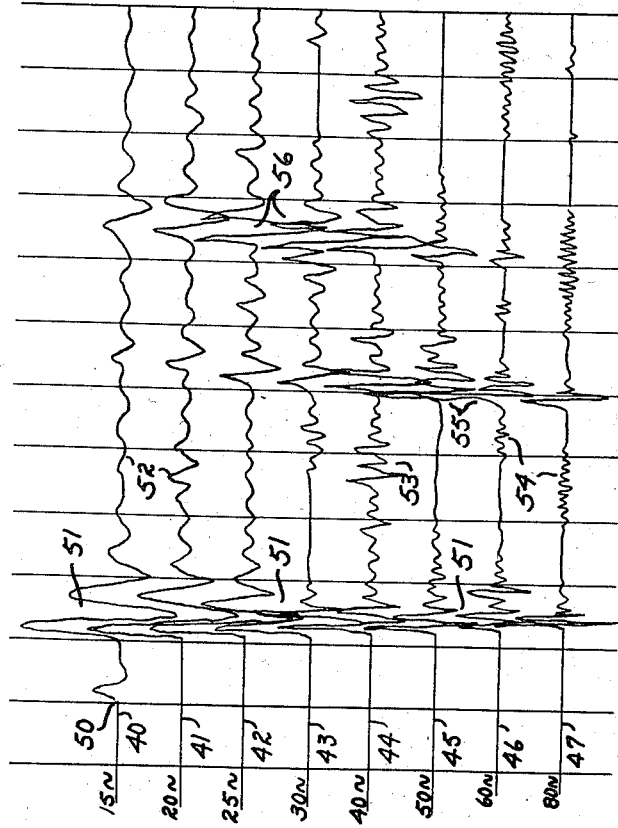
Fig. 2 is a reproduction of a graphical record obtained in accordance with the invention.

Each recording channel includes a transmission line 25 by means of which the impulses from the geophones 10 to 17 are transmitted to an amplifier 26. The outputs of these amplifiers are in turn transmitted to filters 30 to 37 inclusive, of which one is provided for each recording channel. These filters are of well known construction and each is designed to pass a band of frequencies as for example, a band having a width of twenty cycles. In the illustrated arrangement whereby the graphical record of Fig. 2 is produced the median frequencies of the bands of frequencies passed by the filters 30 to 37 inclusive are 15, 20, 25, 30, 40, 50, 60 and 80. It is to be noted that these bands of frequencies increase slightly in width as the higher frequencies are approached.

The arrangement is therefore such that substantially all frequencies in the spectrum of the seismic waves are utilized and the recording at the higher frequencies in the respective channels encompasses a wider band of frequencies so as to provide sufficient energy for recording at these higher frequencies which have greater attenuation than is produced upon the lower frequencies.

The output from the respective band pass filters 30 to 37 is transmitted to the recording mechanism which includes galvanometers 38 and suitable recording means for recording the respective wave traces on a moving tape 39. The completed record as already indicated is shown at Fig. 2 in which the wave traces 40 to 47 are respectively recorded by the energy passed thru the respective filters 30 to 37. The abscissae of these curves represents time, the graphical record being separated into intervals of one-thousandths of a second.

The shot point is indicated by the break in curve 40 at the point 50. The initial recording in the respective channels shown at 51 indicates the arrival of the directly transmitted waves set up the initiating impulse. Thereafter it is to be noted that certain vibrations are shown at 52, 53 and 54 due to seismic unrest and such portions of the curve are of little or no significance. At 55, however, is shown the arrival of the reflected waves from the stratum 1 and it is to be noted that this stratum is of such nature that the predominant portion of the record lies within the higher recorded frequencies. After the arrival of the reflected waves from the stratum 1 a short interval of time elapses before the arrival of the reflected waves from the stratum 2. The record of these latter waves is indicated at 56 and it will be noted that the predominant portion of the recording energy is in the vicinity of thirty cycles per second.

From the foregoing it is believed apparent that the record illustrated in Fig. 2 and obtained in accordance with the invention provides an indication as to the location of the strata 1 and 2 and also the nature of such strata since the record is frequency analyzed thereby providing information regarding the frequency reflection characteristics of the respective strata. Attention is also directed to the fact that the method of the invention is of particular importance where the strata 1 and 2, or additional strata at greater or lesser depth, are in relatively close proximity to each other. Such condition will bring the traces 55 and 56 in closer relation because of the shorter interval of time between the arrival of reflections from successive beds. In such event the successive reflections can be readily separated, whereas they would appear as superposed and obscured traces if frequency analysis in accordance with the invention were not utilized.

While the foregoing specific disclosure of the apparatus and technique of the invention refers to the production of a single wave trace in each geophone circuit it is to be understood that the energy from any or all of the individual geophones may be utilized to produce a plurality of wave traces each of which is produced by a selected band of frequencies from the seismic spectrum. The disclosure is offered as illustrative only and it is intended that the invention shall not be confined thereto but shall broadly comprise method and apparatus for obtaining in a seismic record the maximum of information relative to the location and nature of subsurface strata by the provision of a frequency analyzed record of the waves reflected from such strata.

What is claimed is:

1. In the seismic method of geophysical prospecting wherein a plurality of spaced detectors convert arriving seismic impulses into pulsations of electrical energy to obtain frequency analyzed seismic records, the steps of transmitting the pulsations from each point of detection to an amplifier, coordinating a series of band pass filters, conducting the amplified impulses through such series of band pass filters, the band of frequencies passed by each individual filter being different from that passed by each of the other filters so that the series of filters when coordinated together pass the spectrum of frequencies present in the arriving seismic impulses, and recording in separate traces the impulses passed by the respective filters.

2. In the seismic method of geophysical prospecting wherein seismic impulses arriving at a plurality of predetermined spaced points are detected and recorded, the steps of sending up a series of coordinated filters each of which is to filter a predetermined band of frequencies, filtering the detected impulses from each point to pass only a limited band of frequencies from such point, the frequencies passed from all of the points comprising a plurality of frequencies greater than those covered by any individual band of the frequencies in the spectrum of the seismic impulses, and recording as an independent trace the impulses passed from each of the points of detection.

3. In the seismic method of geophysical prospecting wherein the seismic impulses arriving at a plurality of spaced points are independently detected and recorded, the steps of filtering from the detected impulses from each point all except a limited band of frequencies, the series of bands of frequencies being coordinated so that the different bands of frequencies passed from the points of detection include energy from all portions of the spectrum of the seismic impulses, amplifying the energy in the respective bands of frequencies, and recording as an independent trace the amplified impulses from each of the bands.

JOSEPH L. ADLER